Patented Jan. 9, 1934

1,942,736

UNITED STATES PATENT OFFICE 1,942,736

COATING COMPOSITION

Wilmer F. Whitescarver, Rutledge, and Horace H. Hopkins, Ridley Park, Pa., assignors to E. I. du Pont de Nemours & Company, Wilmington, Del., a corporation of Delaware No Drawing. Application July 2, 1930
Serial No. 465,444

3 Claims. (Cl. 134—26)

This invention relates to coating compositions and more particularly to an improvement in paints of the type used to produce the decorative surface on flexible floor coverings of either the built-up saturated felt type or the linoleum composition type.

In the usual practice of manufacture, certain types of floor coverings are made by the mechanical application of a paint to a built-up saturated felt base, or to a linoleum base to produce a wearing and decorative surface. The paint used for this purpose is known as "print paint" because in the usual method of operation it is applied to the suitable and previously prepared base by print machines. Print paint is made by grinding a suitable pigment or pigments into a vehicle which consists essentially of a mixture of heat bodied or blown oils, oleoresinous varnish, metallic driers, and volatile thinners. These paints are subject to the disadvantage that they do not dry quickly and when dried they do not possess to the same degree, the desirable properties of alkali resistance, durability, and other essential and advantageous properties. The paints heretofore used required prolonged heating to dry them thoroughly, and the dried films have several disadvantages, in particular they are readily attacked by alkali solutions, and turn somewhat yellow when stored in the dark.

This invention has as an object the production of improved paints capable of providing a surface for floor coverings which will effectively resist the action of soap, soap powders and alkalies in general. A further object is to manufacture paints of this character from a mixture of ingredients which will result in paints having a drying time much shorter than the drying time of those paints commonly used in the art of making floor coverings. A further object is the provision of a floor covering product which becomes less discolored during the usual baking process, or during subsequent storage thereof.

These objects are accomplished by the following invention which comprises a paint having as its vehicle, a mixture of bodied drying oil (or oils) and a varnish made with a hard oil soluble polyhydric alcohol polybasic acid resin, together with driers and volatile solvents, and the application of the paint to a base for the production of a floor covering.

The drying oil with which the varnish is mixed or blended is given a preliminary treatment which imparts a better body to the oil by increasing the viscosity and specific gravity. The treated drying oils may be any of the known drying oils, as for example linseed oil, China-wood oil or perilla oil. These oils may be used alone or admixed in various proportions with each other. The treatment may be heating or blowing with air, carbon dioxide or other gases, or a combination of heating and blowing. The heating and/or blowing may be accomplished in the ordinary open kettle, or may be done in a closed kettle at atmospheric or reduced pressure. Metallic driers may or may not be added during this processing operation. The extent of processing may be varied so that the oil or oils are only slightly changed from their original condition, or it may be carried on until the oil or oils have shown a marked increase in viscosity and specific gravity. A suitable method of pretreating the drying oil is as follows:

Pretreatment of the drying oil portion of the paint vehicle

A suitable treated oil may be prepared by heating in an open kettle 500 pounds of raw linseed oil (varnish grade) to a temperature of 300° C. and holding it at this temperature until the specific gravity of the oil becomes 0.940, at which time 1½ pounds of cobalt linoleate are added, and the heat removed. Any of the other metallic driers may be used in place of, or, in combination with the cobalt linoleate, and the drier or driers may be added at any time while the oil is hot. Likewise, the addition of the metallic drier during the processing of the oil may be eliminated, and so-called "liquid japan drier" added to the oil, or the mixed vehicle, or to the paint at any time prior to its use.

Preparation of the varnish portion of the paint vehicle

The varnish portion of the paint vehicle is made by first preparing a modified polyhydric alcohol-polybasic acid resin suitable for the present purpose and proceeding with the preparation of a varnish from this resin in the general manner of preparing oleoresinous varnishes. The ingredients and methods of preparation of the resins from which the varnish portion of the paint vehicle is made are as follows:

Resin A

| | Parts |
|---|---|
| Glycerol | 14 |
| Phthalic anhydride | 22.5 |
| Rosin | 55.0 |
| Run Pontianak gum | 8.5 |

The term "run" is used in the trade as referring to a resin or gum that has been heated to fusion in order to make the product more soluble.

These ingredients are placed in the usual type of aluminum varnish kettle and heated with stirring to about 268° C. for 9½ hours. A moderate stream of carbon dioxide is then blown through the mixture, while holding the temperature at 268° C., until the acid number is between 5 and 10. The product is poured into cooling pans and when cold is broken into lumps for use in making the varnish. The composition of this resin is approximately 60% rosin glyceride, 30.9% phthalic glyceride and 9.1% Pontianak glyceride.

Resin B

| | Parts |
|---|---|
| Glycerol | 15 |
| Phthalic anhydride | 27 |
| Rosin | 58 |

In making this resin, the same procedure is followed as in resin A with the exception that the final heating is continued until the acid number is between 15 and 20. This resin analyzes 35% phthalic glyceride and 65% rosin glyceride.

Resin C

| | Parts |
|---|---|
| Glycerol | 13.02 |
| Phthalic anhydride | 19.69 |
| Rosin | 67.29 |

The glycerol, acid and rosin, in the proportions indicated, are heated in the varnish kettle until the temperature is raised to 254° C. in about 1¼ hours time. This temperature is maintained for 5½ hours which produces a resin with an acid number of approximately 8. The mass is cooled and broken into lumps for use in making the varnishes.

Resin D

| | Parts |
|---|---|
| Glycerol | 9.72 |
| Phthalic anhydride | 8.01 |
| Rosin | 82.27 |

The same procedure is followed as in resin C with the exception that the temperature of 254° C. is maintained for six hours, producing a resin with an acid number of approximately 14.

In making these resins, the quantity of rosin or other resin acids used is preferably within the limits of fifty to ninety-five per cent of the resin. The rosin not only acts as a solubilizing agent, i. e., imparts the necessary solubility to the resin in the organic solvents of the varnish, but also produces a hard oil soluble resin especially suitable for the purposes of the present invention. From five to twenty per cent of the rosin or resin acids may be replaced by drying and semi-drying oils as well as by the drying oil acids and the semi-drying oil acids. If, however, larger amounts of these latter modifying agents are used, the resulting resin loses its solid hard character and becomes what is known as a long oil resin whereas the present invention is concerned with a hard varnish type resin. The glycerol and phthalic anhydride are merely representative of the class of polyhydric alcohols and of the class of polybasic acids, respectively. Other suitable alcohols are ethylene glycol and pentaerythritol. Examples of other polybasic acids from which the resins may be made are succinic, fumaric, adipic or maleic acid.

The following two examples are illustrative of methods of preparing the varnish portion of the vehicle from the resins of the type above set forth.

Example 1

| | Parts |
|---|---|
| Modified polyhydric alcohol-polybasic acid resin | 26.85 |
| China-wood oil | 18.87 |
| Aromatic hydrocarbon solvent (B. P. 150° C.–200° C.) | 12.50 |
| Aliphatic hydrocarbon solvent (B. P. 150° C.–200° C.) | 34.20 |
| Toluol | 5.46 |
| Liquid japan drier | 1.10 |
| Calcium oleate | 0.58 |
| Manganese oleate | 0.32 |

The resin and China-wood oil are heated to 260° C. and held at that temperature for 65 to 70 minutes. The heating is discontinued and when the mass has cooled to about 205° C., the aromatic and aliphatic hydrocarbon solvents, the toluol, japan drier and calcium oleate are added and the mixture stirred thoroughly. When the product has cooled to about 50° C. the manganese oleate is added with rapid stirring.

Example 2

| | Parts |
|---|---|
| Modified polyhydric alcohol-polybasic acid resin | 100.0 |
| China-wood oil | 80.0 |
| Aliphatic hydrocarbon solvent (B. P. 150° C.–200° C.) | 180.0 |

The resin and China-wood oil are placed in the usual type of varnish kettle and the mass heated to about 274° C. with intermittent stirring. The temperature is held at this point for about one hour and after being drawn from the fire is cooled to about 232° C. and then thinned with the solvent. Liquid japan driers may or may not be added.

The procedure of making the varnish, as well as the proportions of the ingredients, may be modified to some extent as well understood by those skilled in the art. Linseed or other drying oils may be used in place of the China-wood oil. The proportion of resin to oil may be varied but the preferred limits are approximately 5 to 20 gallons of oil to 100 pounds of the resin.

The treated oil and the polyhydric alcohol-polybasic acid resin varnish, prepared in a manner similar to that outlined above, are blended, and then mixed with a pigment or a combination of pigments and ground to a smooth paint. Liquid japan drier and/or additional volatile solvent may or may not be added. The proportions of the treated oil and the resin varnish which are blended may vary through rather wide limits, depending on the predominance of certain characteristics desired in the paint. As an example, they may be blended in equal proportions, or the blend may consist of five parts of oil to one part of varnish. In general, it may be stated that satisfactory blends may be obtained by mixing one part of varnish with from seven-tenths part of oil to nine parts of oil.

Formulæ for satisfactory paints are given in the following examples:

Example 3

| | Parts |
|---|---|
| Blend of bodied or pretreated oil with the varnish as described above | 333 |
| Lithopone | 600 |
| Zinc oxide | 67 |

The treated oil and the polyhydric alcohol-polybasic acid resin varnish may be added direct to the pigment without being previously blended.

*Example 4*

| | Parts |
|---|---|
| Polyhydric alcohol-polybasic acid resin varnish | 33 |
| Bodied oil | 65 |
| Lithopone | 300 |
| Mineral spirits | 2 |

*Example 5*

| | Parts |
|---|---|
| Polyhydric alcohol-polybasic acid resin varnish | 20 |
| Bodied oil | 50 |
| Ultramarine blue | 70 |
| Zinc oxide | 30 |
| English Cliffstone whiting | 50 |

In the above examples of the paints the proportion of the pigments, oil and varnish may be varied as shown and as well known to the trade. For normal conditions the pigments may be 55% to 70%, the bodied oil 20% to 35% and the varnish 5% to 20% of the paint composition.

When the paints set forth in Examples 3 to 5 are thoroughly ground they may be reduced with additional quantities of treated oil and polyhydric alcohol polybasic acid resin varnish, as well as with some of the aforementioned or similar solvents. The amount of solvent used is governed by the desired consistency of the paint which consistency is adjusted to produce the most favorable operating conditions. The following example is illustrative of a paint of this character.

*Example 6*

| | Parts |
|---|---|
| Paint of Example 3 | 900 |
| Polyhydric alcohol-polybasic acid resin varnish | 50 |
| Pretreated oil | 50 |
| Aliphatic hydrocarbon solvent (B. P. 150° C.–200° C.) | 16 |
| Aromatic hydrocarbon solvent (B. P. 150° C.–200° C.) | 8 |

The paints of the type herein disclosed are applied to a built-up saturated felt base or a linoleum base by machines and methods commonly known to the industry. The coated base is then dried in stoves, racks or ovens, heated from 60° C. to 70° C. At 63° C. the paint dries in about 70 hours after which time the built-up coated material is ready for use as a floor covering.

The improved floor covering material produced as described above possesses all of the desirable characteristics of the ordinary type of similar merchandise and, in addition, has several valuable features not found in the products produced by the usual practice. One valuable feature of the invention is the reduction of the normal drying period of the paint. The oil and oleoresinous varnish type of paint now used as a coating for floor coverings requires from 96 to 144 hours to dry to a satisfactory degree of hardness, whereas the paint made according to the present invention will dry satisfactorily in approximately 70 hours. This reduction in the drying time is a saving in operating costs and permits greater speed of production with a given equipment. A further improvement over the prior art resides in the greater alkali resistance of the herein disclosed paint. If a 2% aqueous solution of sodium hydroxide be placed on the dried film of the usual oil and oleoresinous varnish paint and allowed to remain there for 30 minutes, the paint is badly yellowed and softened, whereas under the same conditions the paint disclosed herein is only slightly yellowed and not appreciably softened. A still further advantage is the relative lack of discoloration of the disclosed paint during the stoving or drying period. Our improved paints also show a lesser degree of yellowing under the prevalent conditions of packing and storage of the merchandise.

As many apparently widely different embodiments of this invention may be made without departing from the spirit and scope thereof, it is to be understood that we do not limit ourselves to the specific embodiments thereof, except as defined in the appended claims.

We claim:

1. A process of manufacturing a coating composition which comprises the steps of preparing a varnish by adding volatile solvent to the product obtained by cooking a drying oil with an oil soluble resin, and blending a bodied drying oil with said varnish, said resin comprising the reaction product of a polyhydric alcohol, a polybasic acid and resin acid.

2. A process of manufacturing a floor covering print paint which comprises the steps of preparing a varnish by cooking a drying oil with an oil soluble glyceryl phthalate resin in the proportion of about 5 to 20 gallons of oil per 100 pounds of the resin, making a blend of said varnish with bodied drying oil in proportion of one part of varnish with 0.7 to 9 parts bodied drying oil, incorporating a pigment with said blend of varnish and drying oil, said resin comprising the reaction product of glycerol, phthalic anhydride, and a resin acid.

3. A print paint adapted for application by print machines to flexible floor coverings comprising a resin-drying oil varnish admixed with bodied drying oil, said resin being the reaction product of a polyhydric alcohol, a polybasic acid, and a resin acid, said print paint being characterized by shorter drying time and higher alkali resistance than print paints the vehicles of which consist of bodied oils or of oleoresinous varnishes not admixed with said bodied drying oil, said print paint being obtainable by dissolving said resin in drying oil with heat treatment and adding to the varnish thus obtained drying oil bodied to a viscosity higher than that which is imparted to the varnish during the heat treatment involved in the manufacture of said varnish.

WILMER F. WHITESCARVER.
HORACE H. HOPKINS.